United States Patent Office 2,827,452
Patented Mar. 18, 1958

2,827,452
STABILIZATION OF MATERIALS
Hermann Schlenk, Donald M. Sand, and Jerry Ann Tillotson, Austin, Minn., assignors to Regents of the University of Minnesota, Minneapolis, Minn., a corporation of Minnesota
No Drawing. Application May 31, 1955
Serial No. 512,324
14 Claims. (Cl. 260—209)

This invention relates to the preservation and stabilization of organic chemical substances. More particularly this invention relates to the protection of organic chemical materials against deterioration, especially autoxidation, by including the materials in a carbohydrate complex.

The discovery that autoxidizable fatty acids are stabilized when included in urea is disclosed in the copending application of Hermann Schlenk, one of the joint inventors of this invention, and Ralph T. Holman, Serial No. 189,745, filed October 12, 1950, and now abandoned. With urea, stabilization by inclusion is restricted to fatty acids, or more generally, to essentially, unbranched molecules since only straight chains preferentially react with urea. Potential physiological uses of inclusion compounds make desirable the choice of host molecules other than urea.

It has now been discovered that autoxidizable substances and others are stabilized by inclusion in carbohydrates such as alpha- and beta-dextrins, starches and the like. The mode of autoxidation inhibition is different from that of chain inhibitors such as hydroquinone or similar antioxidants. This is proven by the fact that impure adduct preparations will autoxidize rapidly although the host molecules, i. e. carbohydrates are present in large amounts.

The principal object of this invention is to provide a method of preserving and stabilizing organic chemical materials subject to deterioration or change by including them in carbohydrates by forming complexes.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention these being indicative, however, of but a few of the various ways in which the principles of the invention may be employed.

Broadly stated, this invention comprises the method of stabilizing and preserving organic chemical substances, which are subject to physical or chemical change by reacting these materials with a complex-forming carbohydrate in amounts and under such conditions as to form complexes or inclusion compounds. The preservation of the qualities of the organic compounds may be utilized during processing, handling and storing of the material before final use. The procedure may be applied to bulk materials subject to undesirable chemical and physical change but it is also applicable on a small scale when the stabilization of some ingredient admixed with bulk material is desired. The type of organic chemical compound to which the procedure is applied is not limited by either structure or chemical characteristics of the compounds. They may be liquid, solid, or gaseous. The compounds are limited in practical application of the invention to those which are subject to autodeterioration or autochange by autoxidation, radiation, polymerization and the like upon standing or in storage. By "autodeterioration" and "autochange" are meant phenomena which are spontaneous or self-occurring such as result from normal storage or exposure to the atmosphere under normal conditions and the like, such as autoxidation, volatilization, etc.

This invention is useful for binding gas or volatile material in a solid and stable form, thus greatly decreasing the volatility. The vapor pressure of the compounds is greatly lowered.

Inclusion compounds are a special type of complex. They provide a means by which one compound can be bound with another suitable chemical without changing the chemical character of either. The molecules are unaltered in their chemical nature. The individual compounds may be reconstituted and readily isolated if the presence of the complexing agent would interfere with the eventual use of the bound material.

A wide variety of complex-forming carbohydrate materials are useful in the practice of this invention among which may be mentioned:

Alpha, beta, and gamma cyclodextrins: These oligosaccharides, sometimes called Schardinger dextrins, are more exactly described by the nomenclature as cyclohexaamylose, cycloheptaamylose, and cyclooctaamylose respectively;

Starches, i. e., polysaccharides from various natural sources: More specifically, without being exhaustive in this enumeration, we characterize the types of starches as they may be used for protective inclusion, by mentioning their sources: corn, potato, tapioca, wheat, sago, sweet potato, rice, soybean, waxy maize, lily bulb, banana, wrinkled seed peas or other plant sources; bacterial and protozoal starches such as dextrans; animal and yeast starches such as glycogen. These starches may be used as they are obtained as genuine substances after removal of extraneous materials. Also they may be used partially modified, purified or fractionated. As specific examples, soluble starches are mentioned as provided by the Lintner or other processes.

One essential feature for the inclusion reaction bringing about protection is the carbohydrate character of the including material, which provides the necessary chemical affinity for the association with the moiety included. The only other general requirement is the architectural fit between the components which permits the attracting forces to act in a multitude of places distributed over the full length of the molecule included. This architectural fit is inherent in the structure of the cyclodextrin; polysaccharides, not having cyclic structures, can adjust themselves to the required shapes due to the flexibility or free rotation of their marco molecules. Both prerequisites, carbohydrate character as well as flexibility of their molecular shape, are found in many other classes of polysaccharides, so among materials of potential value for inclusion stabilization are mentioned: celluloses, glucans, manans, galactamanans, xylans, fructosans, and pectins.

Amylose, for example, essentially is a straight chain polysaccharide. The long carbohydrate chain forms a spiral or helix which holds the guest compound in its empty spiral channel. The helix of the starch has an adjustable width, i. e. for saturated fatty acids, one turn of the spiral is made up by six glucose units, but the helix can be wider so that seven or eight glucose units form one complete turn. The helix becomes wider according to the requirements of the molecule which is included. This mechanism of the inclusion reaction is easiest demonstrated and explained with amylose. It applies also to branched chain polysaccharides such as amylopectin or saccharides of intermediate degree of branching. It is implied that mixtures of different types starches can be used for protective inclusion also.

Starches are advantageous as host molecules for nutrients, vitamins, biologicals and the like in that they are themselves nutritive. The complexes of this invention provide an excellent means for the administration and slow release of substances such as vitamins, biologicals and the like avoiding the necessity for many repeated dosages.

Alpha-dextrin (cyclohexaamylose) is a cyclic oligosaccharide derived from potato or corn starch by enzymatic processes. It consists of six glucose units linked together by maltose type linkages. Thus, it is closely related to metabolites of the body and is also a preferential complexing agent for chemicals of therapeutic or nutritional use. Beta-dextrin (cycloheptaamylose) is closely related to alpha-dextrin and possesses the same advantages.

The complexes are formed by admixing the reactants in a solvent for one of the compounds, either the host or the guest. Preferably, a mutual solvent is used. A pre-complex formation takes place in solution. Although pre-complexing takes place in most instances by stirring the ingredients at room temperature dissolution of the materials is often accelerated and consequently pre-complex formation is promoted by the use of elevated temperatures up to about 60 to 70° C. No complex is formed above these temperatures. In most instances the complex precipitates as crystals upon cooling to room temperatures or below, although in some cases the precipitant may not be crystalline complex inclusion compound throughout. For example, in some instances where starch is used as the host material part of the guest molecule may be simply embedded in the host and thereby protected. The precipitant is separated by decantation, filtration, centrifugation or the like and then dried.

The capacity of the host molecule to receive a guest molecule is dependent upon the spaces within the host molecule. That is, the amount of material which can be bound and protected is determined volumetrically. Accordingly no fixed molar ratio between the host and guest molecule can be stated. When the guest molecules are of materials having a density of about one, it may be stated as a general rule that starches will bind up to about 8% of their own weight of a guest compound and dextrins will receive up to about 10%. The mechanism is comparable to filling a box or can or similar container. The container will not hold more than its maximum capacity although it may be filled with any lesser amount.

Where maximum utilization of the protective and stabilizing characteristics of the complex is to be achieved the complex is initially formed with an excess of the guest compound in order to include as much of the guest as possible. When this is done, in many instances, part of the excess guest material clings to the outside of the crystalline complex. Only the material which is included is protected so that for optimum protection the complex should then be purified by heating to drive off the excess guest material. This is preferably done under high vacuum.

On the other hand, when something less than maximum utilization of the protection afforded by the inclusion compounds is not objectionable the complex may be initially formed without an excess of the guest molecule in order to avoid the necessity for distillation. In each instance the capacity of a particular complex forming carbohydrate host molecule for any particular guest can be determined empirically by initially attempting to react a large amount of the guest compound, purifying the resulting complex and then isolating the material which was bound.

The invention is illustrated by the examples:

EXAMPLE 1

Alpha-dextrin (2 g.) was dissolved in 15 ml. water and mixed with linoleic acid (0.4 g.) dissolved in 15 ml. ethanol. The mixture was heated to 70° C. Complex formation took place upon cooling. After 4 hours the crystals formed were isolated by centrifugation and by subsequent suction on a Buechner funnel. Approximately half of the amount was put in a distilling tube and heated to 130–150° C. at 0.5 mm. pressure for 16 hours. Some excess linoleic acid condensed in the cold part of the distilling tube. The residue (I) was pure complex consisting of alpha dextrin (92.5%) and linoleic acid (7.5%).

The other portion (II) was washed with ethanol and dried at 0.5 mm. Its composition was 92.3% alpha-dextrin and 7.7% linoleic acid.

Complexes I (570 mg.) and II (920 mg.) were placed in Warburg vessels. All manipulations were carried out under nitrogen so far as practicable to avoid any autoxidation during the preparation. Upon immersion of the vessels in a 37° C. bath, they were flushed with pure oxygen. After 4 minutes the system was closed and the oxygen uptake was measured manometrically and compared with the oxygen uptake of pure linoleic acid (III).

Table I.—Oxygen uptake of linoleic acid in alpha-dextrin at 37° C. under 100% oxygen

| Substance | Mg. Acid | Microliter uptake after hours | | | | | | |
|---|---|---|---|---|---|---|---|---|
| | | 2 | 5 | 10 | 20 | 30 | 40 | 50 |
| I | 43 | 20 | 40 | 45 | 60 | 85 | 115 | 150 |
| II | 71 | −45 | −60 | −50 | 120 | 430 | 760 | |
| III | 80 | | 181 | 600 | 2,500 | 5,400 | 7,860 | 9,750 |

It is seen that complex I which had been purified by heating under high vacuum afforded virtually complete protection. The conditions for the autoxidation are very rigorous and the value of 150 microliter after 50 hours may be considered as equivalent to a value after several weeks of exposure to air. In fact, this and other samples similarly prepared did not exhibit any signs of autoxidation after months of storage in an air-filled stoppered test tube.

The use of pure linoleic acid as the control is a severe test of the effectiveness of the complexes as protective agents. Exposed surfaces is one of the factors determining the rate of autoxidation. The large surface of the powdery adducts thus compares unfavorably with the relatively small exposed surface of the linoleic acid. Nevertheless, the rate of autoxidation of the pure material in amounts approximating those in the adducts were taken as control rates in this and other examples.

EXAMPLE 2

The formation of a solid and relatively stable carbon dioxide alpha-dextrin complex is easily demonstrated. Water containing 20% alpha-dextrin was saturated with carbon dioxide. A crystalline precipitate was formed which did not dissolve at room temperature. Upon heating, an abundant amount of carbon dioxide was released while the crystals dissolved. They were stable in aqueous suspension at room temperature, as microscopic observation showed. The characteristic shape of the crystals did not change over a period of hours, and micro gas bubbles could not be detected in the mother liquor. The substance can be isolated by centrifugation and drying in air, or by suction. After two days of exposure to air, it was analyzed for carbon dioxide. In several preparations the molar ratios carbon dioxide: alpha-dextrin varied from 1:10 to 1:1, corresponding to 0.5% to 5% bound in the dextrin. Without discussing here the scientific bearing of this unexpected complex formation, attention may be called to the fact that the properties of the $CO_2$ complex described above fulfill in an ideal way the requirements for its use as baking powder.

Other alpha-dextrin inclusion compounds have been made with: Vitamin K (2-methyl naphthoquinone); various fatty acids including butyric, valeric, isobutyric, isovaleric, pelargonic, capric, undecylenic, lauric, myristic, palmitic and stearic; mono- and symmetrical di-palmitin; hydrocarbons (Skellysolve F, C, and S, a series of solvents consisting of hexanes, heptanes, octanes and solvent naphtha); and gamma, gamma, gamma-trichloro-beta-oxybutyric acid.

EXAMPLE 3

Beta-dextrin (8 g.) and linoleic acid (1.2 g.) were mixed and heated in 100 ml. of 50 vol. percent aqueous ethanol. The mixture was stirred for 4 hours at room temperature and then centrifuged. After drying the solids over sulfuric acid, then over phosphorous pentoxide at 0.5 mm. pressure, the yield was 7.7 g., 7.3% of its weight being linoleic acid. An aliquot of this was put into the center of a Warburg vessel (I, 1.5 g.). A second aliquot was placed in a Warburg vessel containing 0.5 ml. water in the sidearm so that the complex was not wetted (II, 1.5 g.). A third aliquot was washed thoroughly with trimethylpentane and dried at high vacuum. It contained 7.1% linoleic acid (III, 1.5 g.). Another aliquot was treated for 9 hours at 122° C./0.5 mm. It contained 6.9% linoleic acid (IV, 1.7 g.). The oxygen uptake of these samples is compared, in Table 2, with that of pure linoleic acid initially used for the preparation (V).

(II, 1.1 g.). The autoxidation of the two samples is compared with that of pure linoleic acid (III) in Table 3.

Table 3.—Oxygen uptake of linoleic acid in beta-dextrin at 37° C. under 100% oxygen

| Substance | Mg. Acid | Microliter uptake after hours | | | | | |
|---|---|---|---|---|---|---|---|
| | | 10 | 20 | 30 | 50 | 100 | 150 |
| I | 98 | 700 | 1,500 | 2,500 | 4,650 | 7,100 | 8,850 |
| II | 88 | | 120 | 150 | 310 | 450 | 750 |
| III | 80 | 600 | 2,500 | 5,400 | 9,750 | 13,900 | 15,400 |

Again it is seen that the crude complex is not satisfactorily protected against oxygen, whereas the heated product is very resistant.

EXAMPLE 5

Beta-dextrin (1.6 g.) and linolenic acid (0.32 g.) were reacted as already described in 20 ml. of 50 vol. percent aqueous ethanol. The mixture was shaken for ¾ hour at room temperature. After heating for 17 hours at 122° C./0.5 mm. the solid residue weighed 1.45 g. and contained 9.6% linolenic acid. An aliquot of this material was brought into a dry Warburg vessel (I, 0.7 g.), another aliquot was placed in a vessel containing 0.5 ml. water in the side arm (II, 0.65 g.). The oxygen uptake of pure linolenic acid is given for comparison under (III) in the following Table 4.

Table 4.—Oxygen uptake of linolenic acid in beta-dextrin at 37° C. under 100% oxygen

| Substance | Mg. Acid | Microliter uptake after hours | | | | | | | | |
|---|---|---|---|---|---|---|---|---|---|---|
| | | 2 | 4 | 6 | 8 | 10 | 20 | 30 | 40 | 50 |
| I | 67 | 35 | 45 | 60 | 82 | 95 | 180 | 315 | 460 | 630 |
| II | 62 | −5 | −100 | −210 | −390 | −500 | −690 | −740 | −705 | −655 |
| III | 70 | 50 | 290 | 620 | 1,300 | 2,150 | 6,820 | 9,700 | 11,550 | 12,700 |

Table 2.—Oxygen uptake of linoleic acid in beta-dextrin at 37° C. under 100% oxygen

| Substance | Mg. Acid | Microliter uptake after hours | | | | | | |
|---|---|---|---|---|---|---|---|---|
| | | 10 | 20 | 30 | 50 | 100 | 150 | 200 |
| I | 110 | 120 | 360 | 780 | 1,600 | 4,000 | 6,000 | |
| II | 110 | −250 | −180 | −200 | 20 | 360 | 800 | 1,350 |
| III | 107 | 120 | 230 | 400 | 750 | 2,500 | 4,500 | 6,200 |
| IV | 117 | 60 | 100 | 110 | 230 | 320 | 450 | |
| V | 80 | 600 | 2,500 | 5,400 | 9,750 | 13,900 | 15,400 | 16,300 |

As in Table 1, it is seen that the product heated in vacuo is preserved best (IV). The crude complex showed some protection against oxygen (I). Surprisingly enough, the effect was greatly increased when the crude substance I was tested under humid oxygen (II). This is contrary to experience, in which humidity is known to be an accelerator rather than an impediment to autoxidation. When the crude complex was washed, the protective quality was somewhat improved (III) but less satisfactory than when the product is heated under vacuum.

EXAMPLE 4

The complex of beta-dextrin and linoleic acid was prepared as before from 5 g. and 0.4 g. respectively in 350 ml. water. The product weighed 2.6 g. and contained 8.2% linoleic acid. An aliquot of this material was placed in the Warburg apparatus (I, 1.2 g.). The remainder was subjected to a heat treatment at 122° C./0.5 mm. The linoleic acid content of the residue was 8.0%

Most striking in this table are the negative values of (II). Obviously beta-dextrin is able to bind gas molecules. After about 24 hours, the process releasing gas has ended and the pressure curve converts to slowly ascending values indicating an insignificantly slow autoxidation. Extrapolating the ascending branch of the curve, i. e. from between 24 and 57 hours towards time 0 permits an assay of the total oxygen uptake over the whole period. This value does not exceed 200 microliter, whereas the same total value for I is 630. The improved protective effect in the presence of water is clearly indicated.

EXAMPLE 6

Beta-dextrin (3 g.) and methyl linolenate (0.8 g.) were heated in 40 ml. of 50 vol. percent aqueous ethanol, cooled to room temperature and shaken for 16 hours. The product was isolated and heated in the usual manner, and it then contained 10.8% methyl linolenate. The sample tested weighed 1.0 g. corresponding to 108 mg. of methyl linolenate. The total oxygen uptake under the conditions described for the former experiments amounted to 220 microliter after 80 hours.

EXAMPLE 7

Beta-dextrin (5 g.) was dissolved in 100 ml. water and cinnamaldehyde (0.9 g.) was added. After shaking for 16 hours at room temperature, excess aldehyde could still be detected in the form of microscopic droplets mixed with the crystals. The solids were isolated in the usual manner and heated at 100–140°/0.5 mm. for 3 hours. The residue contained 12.3% cinnamaldehyde. The substance had the sweet odor and the characteristic flavor of cinnamaldehyde. A sample (I, 1.0 g.) was taken for the autoxidation test and its oxygen uptake compared with that of pure cinnamaldehyde (II).

*Table 5.—Oxygen uptake of cinnamaldehyde in beta-dextrin at 37° C. under 100% oxygen*

| Substance | Mg. aldehyde | Microliter uptake after hours | | | | |
|---|---|---|---|---|---|---|
| | | 1 | 2 | 4 | 6 | 50 |
| I | 123 | 30 | 52 | 78 | 110 | 1,070 |
| II | 120 | 1,500 | 2,750 | 4,250 | 5,400 | |

Obviously pure cinnamaldehyde autoxidizes much faster than does linolenic acid. Nevertheless the protective effect of the inclusion in beta-dextrin amounts to a factor of approximately 1/50 in the autoxidation rate. Dextrin is an ideal carrier for synthetic cinnamon flavor or other unstable flavor substances.

Other beta-dextrin inclusion compounds have been made with: vitamin A alcohol, acetate and palmitate; d, 1-alphatocopherol acetate; vitamin K (2-methyl naphthoquinone); vitamin D; various fatty acids including butyric, valeric, isobutyric, isovaleric, pelargonic, capric, undecylenic, lauric, myristic, palmitic, and stearic; hydrocarbons (Skellysolve F, C and S) monopalmitin; quinoline; azobenzene; cholesterol; dibenzylphosphate; gamma, gamma, gamma-trichloro-beta-oxybutyric acid, and vitamin E.

The preparation of the starch complexes was carried out in two ways. According to one method the moiety to be protected was added to the hot solution of starch in distilled water (1 to 4% concentration of starch) and the mixture was slowly cooled under agitation. According to the other method the starch fraction was dissolved in dilute aqueous potassium hydroxide solution and the moiety to be protected was added. Upon neutralization with dilute acid solution a fine emulsion forms which slowly separates out the starch complex. This method can be carried out at room temperature. High temperatures are avoided, this being important in particular for preparation using vitamin A or its derivatives.

The analysis of the starch complex was made by dissolving the material in 2 N potassium hydroxide. Vitamin A is then still bound tight by the starch in the aqueous liquid phase and is not available for ether extraction. Methanol is added to the clear alkaline solution to precipitate the starch. The vitamin can then be extracted with ether and analyzed according to known procedures.

EXAMPLE 8

Crystalline amylose obtained by butanol precipitation was suspended in water. The butanol was distilled off and the volume of aqueous starch solution adjusted to 90 ml. of water containing 1.62 g. starch. 10 ml. of 2 N KOH was added to the hot solution and the mixture cooled under nitrogen. To the clear solution 150 mg. vitamin A acetate dissolved in 10 ml. ethanol are added under shaking. The emulsion was neutralized with 50% aqueous acetic acid to a pH value of 6. After 5 hours of shaking the precipitate was centrifuged off and dried over KOH in high vacuum. The dry material was ground in a mortar and extracted cold with carbon tetrachloride. This solvent removes excess vitamin which had not been bound but cannot extract vitamin that is included by the solids. The dry material contained 1.1% vitamin A acetate and proved to be stable in the autoxidation test at 37° in a 100% oxygen atmosphere. Within 4 hours, less than 10 microliter of oxygen had been taken up.

EXAMPLE 9

Crystalline amylose was obtained by precipitation with n-amyl alcohol. It was steam distilled to remove the alcohol and adjusted to a volume of 110 ml. which contained 7.2 g. amylose. To the hot solution 20 ml. of 2 N KOH were added. Fifty-five ml. of this starch solution were diluted to a total volume of 110 ml. Vitamin A acetate (0.3 g.) was dissolved in 10 ml. ethanol and added under shaking. The mixture was neutralized to pH 6.0 with acetic acid. After 5 hours shaking it was centrifuged and the solids were dried and washed as described above. The yield was 2.2 g. starch complex containing 1.65% vitamin A acetate. 1.5 g. of this complex took up 167 microliter of oxygen in 91 hours during autoxidation test.

EXAMPLE 10

Fifty-five ml. of the starch solution described in Example 9 were diluted with water to 110 ml. volume and in the same procedure 0.3 g. vitamin A alcohol were reacted with the starch. The yield of dried and washed complex was 2.28 g. which contained 0.89% vitamin A alcohol. 1.5 g. of this complex (13.4 mg. vitamin) had an oxygen uptake of 154 microliter oxygen in 91 hours.

EXAMPLE 11

Crystalline amylose was prepared by precipitation with tertiary amyl alcohol, and treated as described under previous examples. The solution used for the reaction with the vitamin was 100 ml. 0.2 N KOH containing 3.24% amylose. Vitamin A acetate in the amount of 0.30 g. was dissolved in 10 ml. ethanol and shaken to form a fine emulsion. After neutralization with acetic acid and shaking for 4½ hours, the precipitate was centrifuged and treated as previously described. The yield of purified complex was 1.82 g. containing 3.2% vitamin A acetate. 1.0 g. of this complex (32 mg. vitamin A) took up 128 microliter of oxygen in 91 hours.

EXAMPLE 12

A solution of starch (Merck soluble, according to Lintner) was prepared by adding a suspension of 18 g. starch in a small amount of water to 30 ml. of boiling water. Boiling was continued for several minutes and the solution was then autoclaved at 120° C. for 1 hr. The clear solution was cooled rapidly in an ice bath to 45° C., at which temperature 10 ml. aq. 2 N KOH was added. This mixture was cooled to room temperature. The total volume of 365 ml. contained approximately 5% starch and was alkaline corresponding to 0.05 N. A solution of 360 mg. vitamin A acetate in 30 ml. ethanol was added to the above solution and the mixture emulsified by shaking. Acetic acid was added to neutralize the alkali to a final pH of 6. After storing for 16 hours, the water was evaporated and the material eventually dried over alkali. The yellowish solid was ground to about 20 mesh particle size and washed with carbon tetrachloride to yield 16 g. of product containing 1.4% vitamin A in the form of the acetate. One gram was tested for autoxidation under the usual conditions. The oxygen uptake was 345 microliter within 64 hours.

EXAMPLE 13

Sixty-six g. starch (Merck sol., Lintner) was dissolved in water and treated as described before to form an approximately 6% solution in 0.05 N KOH. From this stock solution (1100 ml.), 350 ml. containing 21 g. starch was mixed with 1 g. vitamin A acetate dissolved in 30 ml. ethanol. After neutralization with acetic acid, the mixture was shaken at room temperature for 16 hours and then stored at 2° C. for 4 hours. The precipitate was isolated by centrifugation and dried. Any excess vitamin A was removed by washing with carbon tetrachloride. The total yield amounted to 14.5 g. starch containing 3.1% vitamin A. A sample containing 31 mg. vitamin, in the autoxidation test, consumed 315 microliter oxygen within 16 hours. After this period the sample was put under oxygen under 100% relative humidity at 37° C. Under such conditions, within 24 hours, 260 microliter oxygen were taken up. This indicates that the product is most stable under dry conditions, but still is very well stabilized under humid stress, which would destroy the vitamin itself at a greatly accelerated rate. Final analysis of this sample proved the vitamin A acetate to be essentially unchanged.

The previous examples describing inclusion by means of polysaccharides make use of alkaline solutions of starch. This is of advantage in cases where the polysaccharide is soluble in neutral medium only with difficulty. Such procedure, however, is not essential for achieving the protective effect. The fact that neutral solutions can be used in the preparations is of importance when materials unstable in alkaline solution are to be protected. Such are cinnamaldehyde, vitamin A aldehyde, or others. The following examples compare the two procedures, that is, neutral and alkaline medium for the primary reaction.

EXAMPLE 14

300 ml. of n-butanol was added to the hot aqueous solution of 60 g. Takamine starch in 3.1 of water. After cooling, the crystalline amylose was collected by centrifugation. The material was suspended then in water and the residual butanol removed by steam distillation. Before cooling to room temperature, 160 ml. of 2 N KOH were added so that the total was 400 ml. of an 0.8 N alkaline solution. Methyl linoleate (0.4 g. in 5 ml. ethanol) was added to the mixture which then was adjusted to a pH value of 6 with dilute HCl. A precipitate is formed immediately and the mixture is agitated at room temperature for several hours. After centrifugation the solids were dried and ground to about 20 mesh particle size. Washing with a lipid solvent and subsequent drying to constant weight yielded 6.2 g. of a product containing 4.05% methyl linoleate. The material did not take up any oxygen during a period of 41 hours under the usual testing conditions.

EXAMPLE 15

A butanol fraction was precipitated from 60 g. Lintner starch, as described in the above example for Takamine starch. After removal of excess butanol by steam distillation, methyl linoleate was added to the hot neutral solution. A heavy gel was obtained which was treated at room temperature with three times its volume of methanol. This proved to be advantageous for the subsequent drying of the product inasmuch as it removed the greater part of the water without extracting marked amounts of methyl linoleate bound with the precipitate. After drying in vacuum the material was washed with a lipid solvent (carbon tetrachloride) to yield 4.6 g. of starch containing 4.0% methyl linoleate. A sample of 2.5 g. corresponding to 100 mg. methyl linoleate took up 536 microliter oxygen within 43 hours.

EXAMPLE 16

A solution of 18 g. Lintner starch was prepared in 320 ml. water and autoclaved. One half of this amount (160 ml.) was mixed with 450 mg. vitamin A acetate dissolved in 15 ml. ethanol. After standing for several hours at room temperature and at 2° C. an aliquot of the mixture was brought to dryness and the solid residue then washed with carbon tetrachloride and dried (product A, neutral process).

EXAMPLE 17

The other half (160 ml.) of the original stock solution from Example 16 was mixed with 5 ml. 2 N KOH. To this, 450 mg. vitamin A acetate dissolved in 15 ml. ethanol was added and subsequently the pH was adjusted to pH 6 by means of acetic acid. A precipitate was formed after storage at 2° C. It was isolated by centrifugation, washed, and treated as described in the previous example (product B, alkaline process).

The products from Examples 16 and 17 contained 2.4 to 2.5% vitamin A acetate (2.15 to 2.2% vitamin A). They were subjected to the usual autoxidation test. After a period of 68 hours, 1 g. of product A, neutral process, had taken up 778 microliter oxygen while product B, alkaline process, had taken up 279 microliter oxygen.

Although the alkaline process appears to be advantageous, the products prepared by the neutral process compare very favorably with respect to protection against autoxidation as demonstrated with unprotected vitamin A acetate or methyl linoleate.

The following example describes the use of a different type carbohydrate as a protective component. While Lintner and Takamine starches are essentially straight chain (amylose) type compounds, waxy maize is a virtually pure branched (amylopectin) type of carbohydrate.

EXAMPLE 18

Waxy maize starch was purified by extraction with methanol and then dried. A paste of 18 g. of this product was added to 300 ml. boiling water and then autoclaved, as in other preparations. After cooling to 45° C., 30 ml. of 2 N KOH was added. Half of this solution was mixed with 450 mg. vitamin A acetate dissolved in 15 ml. ethanol. After neutralizing and storing for several hours, an aliquot was brought to dryness. The residue was powdered to a mesh size of approximately 20 and purified by washing with a liquid solvent. Comparative experiments showed that prolonged washing will decrease slightly the content of vitamin without changing the stability of the starch-vitamin compound. A 1 g. sample was tested which contained 2.7% vitamin A acetate (2.4% vitamin A). It proved to be indefinitely stable in the test by not showing any oxygen uptake at all.

Vitamin A acetate is one of the commonly available forms of vitamin A. The stabilization process is applicable, however, to other derivatives of vitamin A as well.

EXAMPLE 19

Vitamin A cyclohexyl carboxylic acid ester (940 mg. in 30 ml. ethanol) was added to 330 ml. of 0.04 N KOH containing 6.0% Lintner starch. After neutralization and storage for several hours at 2° C. the precipitate was collected by centrifuging and dried in vacuum. Purified in the usual manner, 12.3 g. starch containing 3.1% vitamin A ester=2.36% vitamin A was obtained. A 1 g. sample took up 324 microliter oxygen within 68 hours under the usual testing conditions.

It is apparent that many modifications and variations of this invention as hereinbefore set forth may be made without departing from the spirit and scope thereof. The specific embodiments described are given by way of example only and the invention is limited only by the terms of the appended claims.

What we claim is:

1. The method of stabilizing an unstable organic chemical substance which comprises forming an inclusion compound by reacting said organic chemical substance with a complex-forming carbohydrate selected from the group consisting of starches and dextrins.

2. The method according to claim 1 further characterized in that the materials are reacted in a solvent for at least one of the materials.

3. The method according to claim 2 further characterized in that the solvent is a mutual solvent.

4. The method according to claim 1 further characterized in that the unstable included substance is selected from the group consisting of vitamin A and vitamin A derivatives.

5. A stable vitamin A composition comprising an autoxidizable substance selected from the group consisting of vitamin A and vitamin A derivatives included within a complex-forming carbohydrate produced by the method of claim 4.

6. A stable vitamin A composition according to claim 5 further characterized in that said autoxidizable substance is vitamin A acetate.

7. The method according to claim 1 further characterized in that the included compound is gaseous.

8. The method according to claim 7 further energized in that the included gaseous compound is carbon dioxide.

9. A stable solid composition comprising a gaseous substance included within a complex-forming carbohydrate produced by the method of claim 7.

10. A stable solid composition according to claim 9 further characterized in that the gaseous substance is carbon dioxide.

11. A stable flavoring composition which comprises an unstable organic chemical flavoring substance included within a complex-forming carbohydrate produced by the method of claim 1.

12. A stable flavoring composition according to claim 11 further characterized in that said included unstable organic chemical flavoring substance is cinnamaldehyde.

13. The method according to claim 1 further characterized in that the unstable included substance is vitamin D.

14. A method of producing a stable vitamin A composition which comprises dissolving a complex-forming carbohydrate selected from the group consisting of starches and dextrins in a dilute aqueous alkaline hydroxide solution and adding a vitamin A material selected from the group consisting of vitamin A and vitamin A derivatives, neutralizing the solution, and separating out the resulting complex.

References Cited in the file of this patent

Schlenk: "Organic Inclusion Compound," Chemical Abstracts, vol. 45 (1951), pages 7511 and 7512 relied on.

U. S. DEPARTMENT OF COMMERCE
PATENT OFFICE
CERTIFICATE OF CORRECTION

Patent No. 2,827,452                                           March 18, 1958

Hermann Schlenk et al.

It is hereby certified that error appears in the printed specification of the above numbered patent requiring correction and that the said Letters Patent should read as corrected below.

Column 7, line 25, for "butvric" read -- butyric --; column 11, line 8, for "energized" read -- characterized --.

Signed and sealed this 6th day of May 1958.

(SEAL)
Attest:

KARL H. AXLINE                                           ROBERT C. WATSON

Attesting Officer                                       Commissioner of Patents